United States Patent [19]
Furukawa

[11] Patent Number: 5,874,949
[45] Date of Patent: Feb. 23, 1999

[54] HORIZONTAL SYNCHRONIZING SIGNAL FREQUENCY MEASURING INSTRUMENT FOR MULTI-SYNCHRONISM TYPE DISPLAY UNIT

[75] Inventor: Shinya Furukawa, Kanagawa, Japan

[73] Assignee: NEC Corporation, Tokyo, Japan

[21] Appl. No.: 839,950

[22] Filed: Apr. 24, 1997

[30] Foreign Application Priority Data

Apr. 25, 1996 [JP] Japan .................................. 8-105255

[51] Int. Cl.$^6$ .................................................. G09G 5/00
[52] U.S. Cl. .......................................... 345/213; 348/524
[58] Field of Search .................................. 345/213, 211, 345/132, 112, 99; 348/500, 521, 522, 524, 536

[56] References Cited

U.S. PATENT DOCUMENTS 5,138,451 8/1992 Shinkawa et al. ...................... 348/524

FOREIGN PATENT DOCUMENTS 4-97393 3/1992 Japan .

Primary Examiner—Xiao Wu
Attorney, Agent, or Firm—Sughrue, Mion, Zinn, Macpeak & Seas, PLLC

[57] ABSTRACT

The invention provides a horizontal synchronizing signal frequency measuring instrument which can measure a horizontal synchronizing signal frequency with a higher degree of accuracy. The horizontal synchronizing signal frequency measuring instrument includes a first counter for counting a reference clock signal, a second counter of the preset type for counting a horizontal synchronizing signal, and a control section operable to detect an edge of the vertical synchronizing signal, set a first preset value to the second counter, detect that a count value of pulses by the second counter reaches a first preset value, renders a count control signal active, reset and start the first and second counters, detect that the count value by the second counter reaches the second preset value, render the count control signal inactive and calculate a frequency of the horizontal synchronizing signal from the count value of the first counter, the second preset value and a frequency of the reference clock signal. The first counter counts the reference clock signal within a counting enabled period which is controlled by the count control signal.

2 Claims, 4 Drawing Sheets

HORIZONTAL SYNCHRONIZING SIGNAL FREQUENCY MEASURING INSTRUMENT FOR MULTI-SYNCHRONISM TYPE DISPLAY UNIT

BACKGROUND OF THE INVENTION

1. Field of the Invention

This invention relates to an instrument for measuring the frequency of a horizontal synchronizing signal particularly upon production of a horizontal synchronizing signal necessary for synchronous control of a multi-synchronism type display unit which receives a horizontal synchronizing signal and a vertical synchronizing signal from the outside to produce another horizontal synchronizing signal and another vertical synchronizing signal therefor.

2. Description of the Related Art

A horizontal synchronizing signal frequency measuring instrument is conventionally known and disclosed, for example, in Japanese Patent Laid-Open Application No. Heisei 4-97393. The horizontal synchronizing signal frequency measuring instrument disclosed in the document just mentioned is shown in FIG. 4.

Referring to FIG. 4, the horizontal synchronizing signal frequency measuring instrument shown includes a detection time window setting counter 12 which counts the number of pulses of a reference clock signal 11 produced by a reference clock generation circuit 10 to produce a detection window time signal 13, and a horizontal synchronizing signal counter 15 which counts the number of pulses of a horizontal synchronizing signal 14 inputted within the period of a detection window time of the detection window time signal 13. Thus, the horizontal synchronizing signal frequency measuring instrument calculates the horizontal synchronizing signal frequency from the detection window time and the counted pulse number of the horizontal synchronizing signal.

The conventional horizontal synchronizing signal frequency measuring instrument is disadvantageous in that, since each of the front edge and the rear edge of the detection window time includes a measurement error corresponding to one period of the horizontal synchronizing signal at the greatest, the frequency cannot be detected with a tolerance less than one period of the horizontal synchronizing signal, and consequently, a displacement is produced between the horizontal synchronizing signal received from the outside and the horizontal synchronizing signal produced in the inside of the instrument and this makes a displayed image blurred or dull.

SUMMARY OF THE INVENTION

It is an object of the present invention to provide a horizontal synchronizing signal frequency measuring instrument which can measure a horizontal synchronizing signal frequency with a higher degree of accuracy than ever.

In order to attain the object described above, according to the present invention, there is provided a horizontal synchronizing signal frequency measuring instrument for a multi-synchronism display unit which receives a horizontal synchronizing signal and a vertical synchronizing signal from the outside to produce another horizontal synchronizing signal and another vertical synchronizing signal, comprising an inputting section for receiving the vertical synchronizing signal and the horizontal synchronizing signal from the outside, a reference clock signal generation section for generating a reference clock signal having a frequency sufficiently higher than that of the horizontal synchronizing signal received by the inputting section, a first counter for receiving and counting the reference clock signal from the reference clock signal generation section, a second counter for receiving and counting the horizontal synchronizing signal received by the inputting section, the second counter being of the preset type wherein a count number to be counted can be set as a preset value, and a control section operable to detect one of a rising edge and a falling edge of the vertical synchronizing signal received by the inputting section, set a first preset value to the second counter, reset and start the second counter, detect that a count value of pulses by the second counter reaches the first preset value, renders a count control signal thereof active, set a second preset value to the second counter, reset and start the first counter and the second counter, detect that the count value of pulses by the second counter reaches the second preset value, render the count control signal inactive, read out a count value of the first counter then, and calculate a frequency of the horizontal synchronizing signal from the count value of the first counter, the second preset value set to the second counter and a frequency of the reference clock signal, the first counter counting the reference clock signal within a counting enabled period thereof which is controlled by the count control signal from the control section.

Where the frequency of the reference clock signal is represented by f, the second preset value is represented by N, and the count value of the first counter is represented by n, the horizontal F of the synchronizing signal frequency is calculated based on $$F = f \times (N/n)$$

It is to be noted that, as the first preset value to be set to the second counter, a value of a number of pulses necessary to eliminate an equalization pulse signal or some other adjusting pulse signal which is inserted in the vicinity of the vertical synchronizing signal inputted from the outside is set, and as the second preset value, a value is set so that the active period of the count control signal may come to an end before a front edge of a next vertical synchronizing signal.

In the horizontal synchronizing signal frequency measuring instrument, since a period from an edge and a next edge of a horizontal synchronizing signal is detected with a degree of accuracy equal to several times the period of the reference clock signal to count the number of clocks of the horizontal synchronizing signal, there is an advantage in that the accuracy in measurement of the horizontal synchronizing signal frequency is improved comparing with that of the conventional horizontal synchronizing signal frequency measurement instrument described above.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
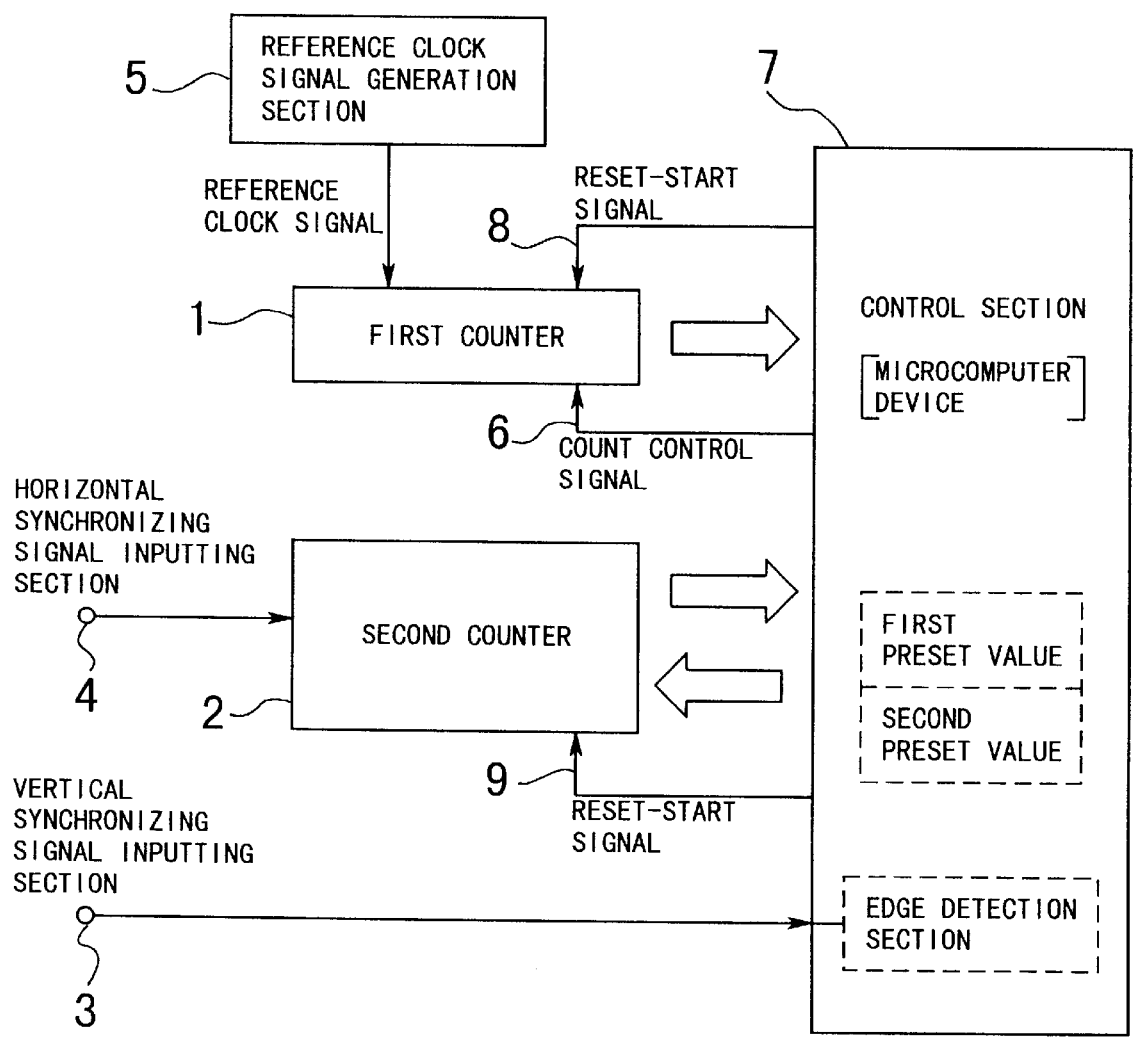
FIG. 1 is a block diagram of a horizontal synchronizing signal frequency measuring instrument showing a preferred embodiment of the present invention.

Referring first to FIG. 1, there is shown a horizontal synchronizing signal frequency measuring instrument to which the present invention is applied. The horizontal synchronizing signal frequency measuring instrument shown includes a vertical synchronizing signal inputting section 3 to which a vertical synchronizing signal is inputted from the outside and a horizontal synchronizing signal inputting section 4 to which a horizontal synchronizing signal is inputted from the outside, a reference clock signal generation section 5 for generating a reference clock signal having a frequency much higher than the horizontal synchronizing signal, a first counter 1 for receiving and counting the reference clock signal from the reference clock signal generation section 5, a second counter 2 of the preset type to which a count value to be counted can be set as a preset value and which receives and counts the horizontal synchronizing signal, and a control section 7 which may be formed from, for example, a microcomputer and controls the other components of the horizontal synchronizing signal frequency measuring instrument.

Figure 2:
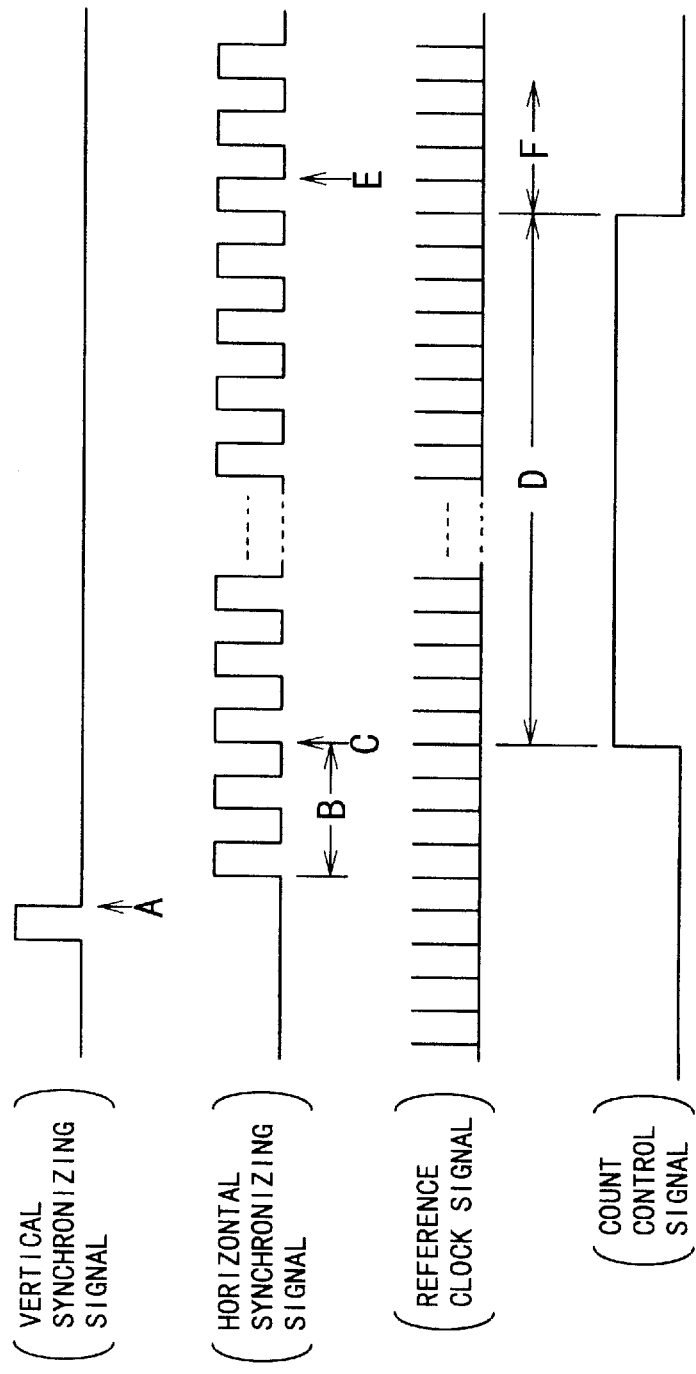
FIG. 2 is a timing chart illustrating operation of the horizontal synchronizing signal frequency measuring instrument of FIG. 1.
Figure 3:
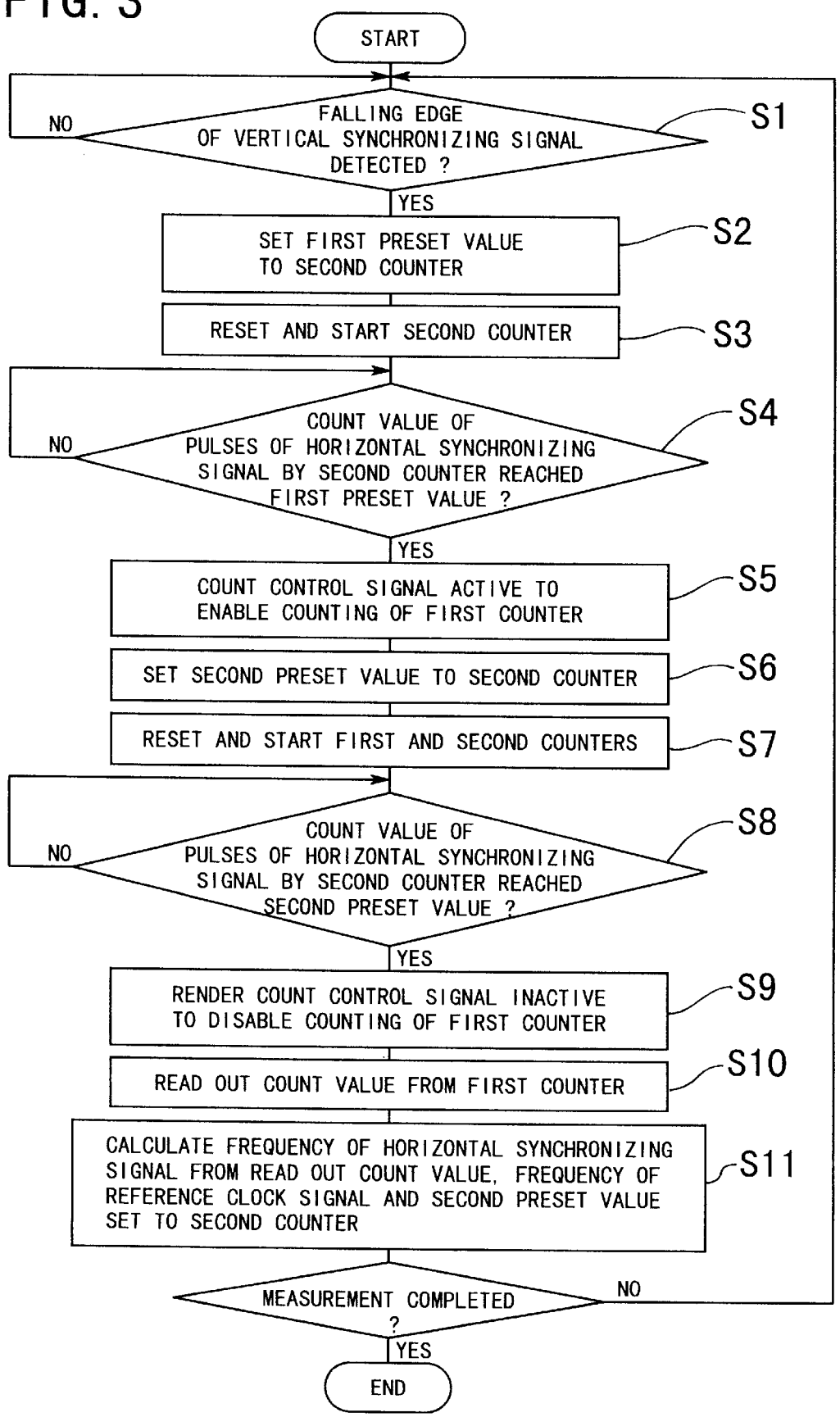
FIG. 3 is a flow chart illustrating operation of the horizontal synchronizing signal frequency measuring instrument of FIG. 1.
Figure 4:
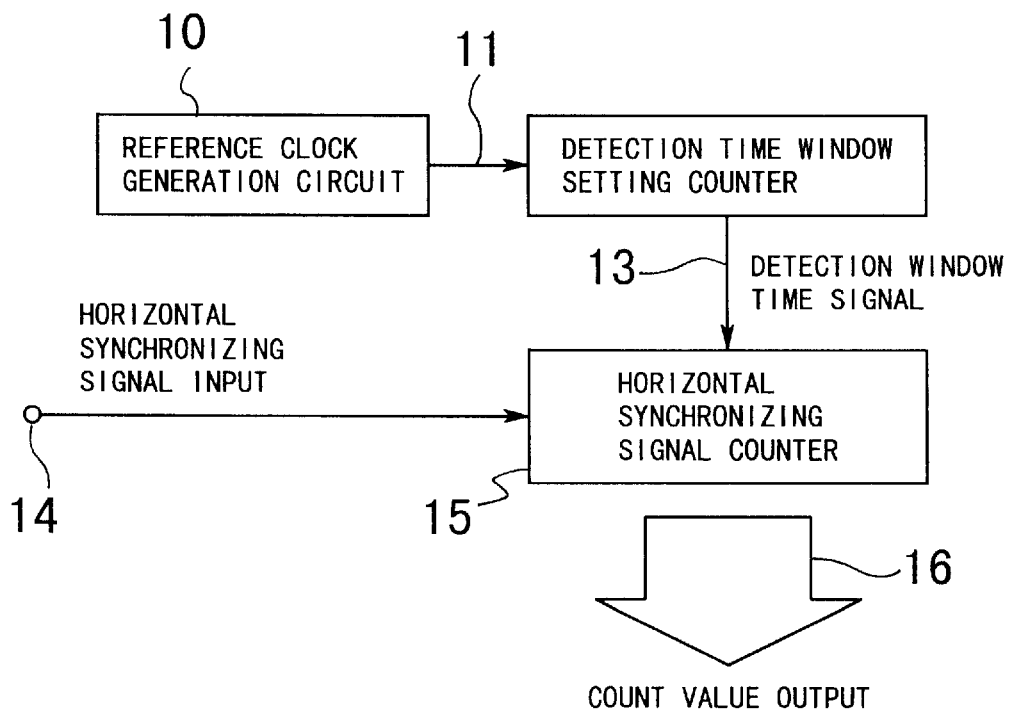
FIG. 4 is a block diagram of a conventional horizontal synchronizing signal frequency measuring instrument.

Referring also to FIGS. 2 and 3, the control section 7 detects an edge such as, for example, a rising edge of the vertical synchronizing signal at the timing A in FIG. 2 in step S1 of FIG. 3, and sets a first preset value such as, for example, "3" to the second counter 2 in step S2. Then, the control section 7 renders a reset-start signal 9 thereof active to reset and start the second counter 2 in step S3 and detects at the timing C after lapse of an interval B of time in FIG. 2 in step S4 that the number of pulses of the horizontal synchronizing signal reaches the first preset value. Then, the control section 7 renders a count control signal 6 thereof active in step S5 and sets a second preset value such as, for example, "100" to the second counter 2, whereafter it renders another reset-start signal 8 and the reset-start signal 9 thereof active to reset and start the first and second counters 1 and 2, respectively, in step S7. When the control section 7 detects that the count value of pulses by the second counter 2 reaches the second preset value at the timing of E after lapse of another interval D of time in FIG. 2 in step S8, the control section 7 renders the count control signal 6 inactive in step S9 and reads out the count value of the first counter 1 in step S10. Then, the control section 7 calculates the frequency of the horizontal synchronizing signal from the count value of the first counter 1, the second preset value set to the second counter 2 and the frequency of the reference clock signal in step S11.

The first counter 1 counts the reference clock signal from the reference clock signal generation section 5 within a counting enabled period thereof which is controlled by the count control signal 6 from the control section 7. Further, the control section 7 operates at an operation speed sufficiently higher than the frequency of the horizontal synchronizing signal.

Where the frequency of the reference clock signal is represented by f, the measurement count value as the second preset value is represented by N, and the count value of the first counter 1 is represented by n, the horizontal synchronizing signal frequency F to be measured is represented as the following expression:

$$F = f \times (N/n)$$

For example, if the horizontal synchronizing signal frequency is 20 KHz and the frequency of the reference clock signal is 2 MHz, then while a measurement value obtained using the conventional horizontal synchronizing signal frequency measuring instrument described hereinabove includes a measurement error of 100 µs which corresponds to two periods of horizontal synchronizing signal clocks at the greatest, the horizontal synchronizing signal frequency measuring instrument according to the present invention can suppress the measurement error to 1 µs corresponding to two periods of the reference clock signal at the greatest.

Further, if the control section 7 has an operation speed with an operation clock frequency of approximately 40 MHz, then it can operate at a sufficiently high speed with respect to the reference clock signal frequency. Thus, the control section 7 may be formed, for example, from "µPD78014" which is a single chip microcomputer by NEC.

Having now fully described the invention, it will be apparent to one of ordinary skill in the art that many changes and modifications can be made thereto without departing from the spirit and scope of the invention as set forth herein.

What is claimed is:

1. A horizontal synchronizing signal frequency measuring instrument for a multi-synchronism display unit which receives a horizontal synchronizing signal and a vertical synchronizing signal from the outside to produce another horizontal synchronizing signal and another vertical synchronizing signal, comprising:

an inputting section for receiving the vertical synchronizing signal and the horizontal synchronizing signal from the outside;

a reference clock signal generation section for generating a reference clock signal having a frequency sufficiently higher than that of the horizontal synchronizing signal received by said inputting section;

a first counter for receiving and counting the reference clock signal from said reference clock signal generation section;

a second counter for receiving and counting the horizontal synchronizing signal received by said inputting section, said second counter being of the preset type wherein a count number to be counted can be set as a preset value; and a control section operable to detect one of a rising edge and a falling edge of the vertical synchronizing signal received by said inputting section, set a first preset value to said second counter, reset and start said second counter, detect that a count value of pulses by said second counter reaches the first preset value, renders a count control signal thereof active, set a second preset value to said second counter, reset and start said first counter and said second counter, detect that the count value of pulses by said second counter reaches the second preset value, render the count control signal inactive, read out a count value of said first counter then, and calculate a frequency of the horizontal synchronizing signal from the count value of said first counter, the second preset value set to said second counter and a frequency of the reference clock signal;

said first counter counting the reference clock signal within a counting enabled period thereof which is controlled by the count control signal from said control section.

2. A horizontal synchronizing signal frequency measuring instrument as claimed in claim 1, wherein, where the frequency of the reference clock signal is represented by f, the second preset value is represented by N, and the count value of said first counter is represented by n, the horizontal F of the synchronizing signal frequency is calculated based on $$F = f \times (N/n).$$

* * * * *